(12) United States Patent
Pierre

(10) Patent No.: US 10,391,701 B2
(45) Date of Patent: Aug. 27, 2019

(54) MOLD BOTTOM WITH WIDE AIR VENTS FOR THE FORMING OF A CONTAINER

(71) Applicant: SIDEL PARTICIPATIONS, Octeville-sur-Mer (FR)

(72) Inventor: Ivan Pierre, Octeville-sur-Mer (FR)

(73) Assignee: SIDEL PARTICIPATIONS, Octeville-sur-mer (FR)

( * ) Notice: Subject to any disclaimer, the term of this patent is extended or adjusted under 35 U.S.C. 154(b) by 231 days.

(21) Appl. No.: 15/381,858

(22) Filed: Dec. 16, 2016

(65) Prior Publication Data

US 2017/0173845 A1  Jun. 22, 2017

(30) Foreign Application Priority Data

Dec. 16, 2015 (FR) ...................................... 15 62523

(51) Int. Cl.
| | | |
|---|---|---|
| *B29C 49/62* | (2006.01) | |
| *B29C 49/48* | (2006.01) | |
| *B29K 67/00* | (2006.01) | |
| *B29K 105/00* | (2006.01) | |
| *B29L 31/00* | (2006.01) | |
| *B29C 49/06* | (2006.01) | |

(52) U.S. Cl.
CPC .............. *B29C 49/62* (2013.01); *B29C 49/48* (2013.01); *B29C 49/4823* (2013.01); *B29C 49/06* (2013.01); *B29C 2049/4828* (2013.01); *B29C 2049/4843* (2013.01); *B29C 2049/4892* (2013.01); *B29K 2067/003* (2013.01); *B29K 2105/258* (2013.01); *B29L 2031/7158* (2013.01)

(58) Field of Classification Search
None
See application file for complete search history.

(56) References Cited

U.S. PATENT DOCUMENTS 5,921,416 A * 7/1999 Uehara ................... B29C 49/18
215/12.1
2007/0026098 A1 2/2007 Lemaistre et al.
(Continued)

FOREIGN PATENT DOCUMENTS

DE  10 2010 032 618 A1  2/2012
DE  10 2013 226 906 A1  7/2015
(Continued)

OTHER PUBLICATIONS

French Preliminary Search Report, dated Aug. 10, 2016, from corresponding French Application.

*Primary Examiner* — Monica A Huson
(74) *Attorney, Agent, or Firm* — Young & Thompson

(57) ABSTRACT

Mold bottom for the manufacture by blow molding of a container that has a bottom that is equipped with a seat, with this mold bottom including a unit that has a molding face bearing the at least partial impression of the bottom of the container, with a pressure-release air vent being formed in the unit and emptying out, via an inner opening, on the molding face and, via an outer opening, into a pipe for exposure to air, with this mold bottom also including an insert that is provided with at least one projection housed in the air vent and that has a terminal face bearing the impression of at least one part of the seat of the container, with this insert being provided with an inner circuit for heat regulation of the projection and being mounted to move in relation to the unit.

16 Claims, 6 Drawing Sheets

(56) References Cited

U.S. PATENT DOCUMENTS

2013/0087954 A1* 4/2013 Tsuchiya ............... B29C 49/185
                                                    264/531
2015/0061196 A1    3/2015 Dachs et al.

FOREIGN PATENT DOCUMENTS

| WO | 00/74925 A1   | 12/2000 |
|----|---------------|---------|
| WO | 2005/002820 A1 | 1/2005 |

* cited by examiner

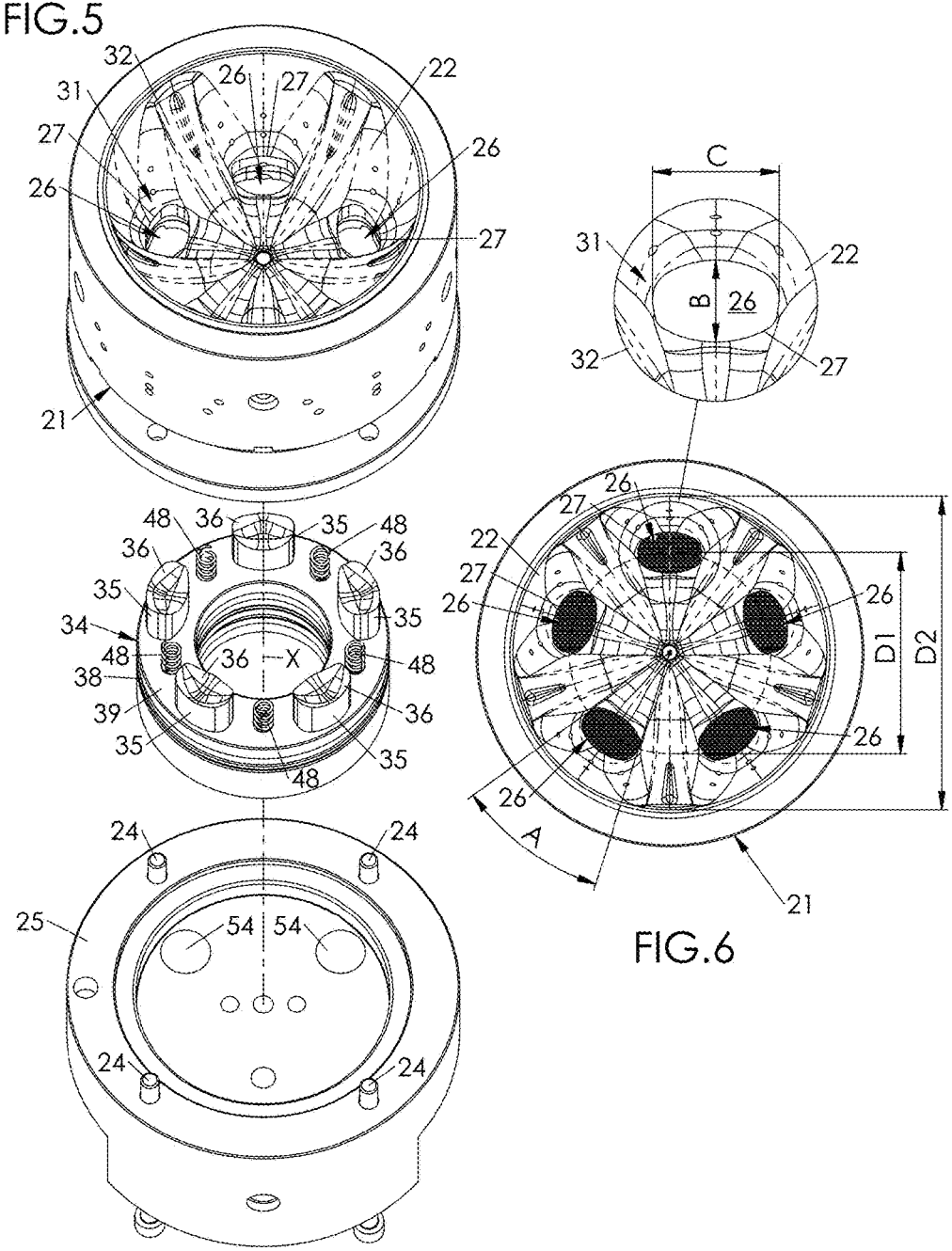

MOLD BOTTOM WITH WIDE AIR VENTS FOR THE FORMING OF A CONTAINER

BACKGROUND OF THE INVENTION

Field of the Invention

The invention relates to the forming of containers by blow molding or stretch blow molding of parisons made of plastic material, such as polyethylene terephthalate, with the term "parison" referring to a preform (ordinarily obtained by injection) or an intermediate container that has undergone a preliminary blow-molding operation starting from a preform.

Description of the Related Art

A container comprises a body, generally cylindrical in shape, a shoulder that forms a narrowing from an upper end of the body, an open neck that extends the shoulder for making possible the filling and the emptying of the container, and a bottom that closes the body at a lower end of the former.

The forming is generally carried out in a mold that delimits a cavity bearing the impression of the container. Such a mold commonly comprises a side wall bearing the impression of the body and the shoulder (this side wall being subdivided into two half-molds that are mutually articulated for making it possible to insert a parison into the mold), and a mold bottom bearing the impression of the bottom of the container, positioned in an opening made between the half-molds.

The preform, after having been heated to a temperature that is higher than the glass transition temperature of its material (a preform made of PET, whose glass transition temperature is approximately 80° C., is ordinarily heated to a temperature of higher than 100° C., typically on the order of 120° C.), is introduced hot into the mold. A pressurized fluid (such as air) is then injected therein to flatten the material, made soft by the heating, against the wall and the mold bottom and thus to impart to the preform the impression of the container.

Without heat regulation of the mold at a moderate temperature (on the order of 10° C. to 20° C.), the containers would emerge at a high temperature (higher than the glass transition temperature), would deform and could not be filled immediately, because they would not have sufficient mechanical strength to hold, without deforming, the pressure caused by the filling.

Allowing the containers to cool freely at the exit of the mold cannot be considered for two reasons. First, taking into account current production rates of the machines (on the order of 50,000 containers per hour per machine, representing more than 2,000 containers per hour and per mold), such cooling (that would take approximately one minute) would require the creation of a buffer stock of hundreds of containers, needlessly increasing the size and the complexity of the production line. Next, and primarily, the plastic material left free to cool would undergo an uncontrolled retraction and would thus lose the impression that is given to it by the mold.

This is why most of the molds are provided with a fluid cooling circuit that is designed to keep the wall and the bottom of the mold at a moderate temperature (on the order of 10° C. to 20° C.) in such a way as to set the material while keeping it under pressure to flatten it well against the wall and the bottom of the mold.

The blow molding furthermore requires evacuating the air that is trapped between the preform during forming and the mold. Evacuation is generally provided, on the one hand in the parting line between the two half-molds, and, on the other hand and primarily in the area of the mold bottom, since it is toward it that the air is pushed by the advance of the material front. For this purpose, the mold bottom is ordinarily pierced by one or more pressure-release air vents, more specifically in the zones reached at the end by the material. Thus, the international application WO 00/74925 (Krupp) illustrates a mold bottom that is designed with a petal-shaped bottom: this bottom is equipped with pressure-release air vents formed by perforations made in recessed reserved places of the bottom corresponding to feet of the container.

At the same time that they start to resolve the issue of the evacuation of air, such air vents raise a new issue, linked to their sizing. As a first approximation, it is necessary to maximize their size (i.e., their diameter or their width) since air is to be evacuated as easily as possible.

Then, however, the material will be introduced therein during the blow molding and will form projecting points of uncontrolled size on the surface of the container. As a second approach, it is therefore necessary to reduce the size of the air vents. It is all the more necessary since it was noted that when the air vents are too wide or when the time of cooling under pressure within the mold is brief (which is generally the case), the material is not correctly formed in the area of the air vents, because it undergoes there a retraction during the cooling of the container outside of the mold. Thermographies carried out by the applicant on the containers exiting from the mold actually show hot points located on the zones of the bottom that are located, in the mold, facing the air vents: In these non-thermoregulated zones of the bottom, the material of the container is not cooled.

These hot points are located in the seat of the container (i.e., in the part of the container by which the former is designed to rest on a flat surface). Since any defect of shape of the seat is detrimental to the stability of the container (and therefore to its perceived quality), most of the manufacturers opted for a compromise approach: reducing the size of the air vents to avoid shape defects; increasing the blow-molding pressure to increase the flow rate of air evacuated via the air vents.

Then, however, the problem arises of meeting, without losing production speed, the new requirements of the market as regards the reduction in energy consumption, which call for reducing the blow-molding pressure.

SUMMARY OF THE INVENTION

This is an approach to all of these problems that this invention provides by first proposing a mold bottom that is designed for a mold for the manufacture, by blow molding or stretch blow molding of a parison made of plastic material, of a container that has a bottom that is provided with a peripheral seat, with this mold bottom comprising:
  A bottom unit that has a molding face in relief bearing the impression of at least a part of the bottom of the container, with a pressure-release air vent being formed in the unit and emptying out, via an inner opening, on the molding face and, via an outer opening, into a pipe for exposure to air
  An insert provided with at least one projection housed in the air vent (or in each air vent) and that has a terminal face bearing the impression of at least one part of the seat of the container, with this insert being provided with an inner circuit for heat regulation of the (or each) projection, with this insert being mounted to move, in relation to the bottom unit, between:

A retracted position in which the terminal face of the (or each) projection is separated from the inner opening and lets the former communicate with the pipe for exposure to air, and A deployed position in which the terminal face extends in the vicinity of the inner opening.

In the retracted position, the projection makes it possible for air to escape via the air vent. In the deployed position, it will impart its shape to the seat of the container while cooling the material (and therefore by setting it). It is therefore possible to increase the size of the air vents without running the risk of deforming the container.

Various additional characteristics can be provided, by themselves or in combination:

In the deployed position, the terminal face of the (or of each) projection extends into the extension of the molding face;

In the deployed position, the terminal face of the (or of each) projection extends in a setback manner, in relation to the inner opening, by a distance of between 0.5 mm and 5 mm;

The terminal face is concave, or convex;

The insert comprises a piston that is mounted in translation in a jacket that is integral with the bottom unit;

The or each air vent comprises an inner portion, which extends to the opening, and an outer portion with a larger cross-section, which extends in the extension of the inner portion by being separated from the former by a shoulder;

The mold bottom comprises a primary pipe for exposure to air, which empties into the air vent in the area of the shoulder;

The mold bottom comprises a secondary pipe for exposure to air, which empties into the air vent in the area of the outer portion;

The unit is provided with a number of air vents that are spaced from one another, and the insert comprises a peripheral series of projections that are spaced from one another;

The molding face bears the impression of a petal-shaped bottom of the container and comprises alternating ribs bearing the impression of valleys of the petal-shaped bottom, which radiate from a central zone, and with recessed reserved places bearing the impression of feet of the petal-shaped bottom, which extend between the ribs, the air vents are made in the recessed reserved places, and the terminal face of each projection bears the impression of the feet of the container.

Secondly, a mold is proposed for the manufacture of a container from a parison made of plastic material, which comprises a side wall bearing the impression of the body of the container, and a mold bottom as presented above, which completes the impression of the container with the side wall.

Thirdly, a method for manufacturing a container is proposed, which method comprises the operations that consist in:

Introducing into a mold as presented above a parison made of plastic material, heated in advance to a temperature that is higher than the glass transition temperature of the material;

In the retracted position of the insert, injecting a pressurized gas into the parison;

While maintaining the pressure in the parison, moving the insert toward its deployed position.

BRIEF DESCRIPTION OF THE DRAWINGS

Other objects and advantages of the invention will become evident from the description of an embodiment, provided below with reference to the accompanying drawings in which:

FIG. 5 is a partial exploded perspective view of the mold bottom;

FIG. 6 is a top view of the mold unit with, in an inset, a detail on a larger scale that is centered on an air vent;

DETAILED DESCRIPTION OF THE PREFERRED EMBODIMENTS

Figure 1:
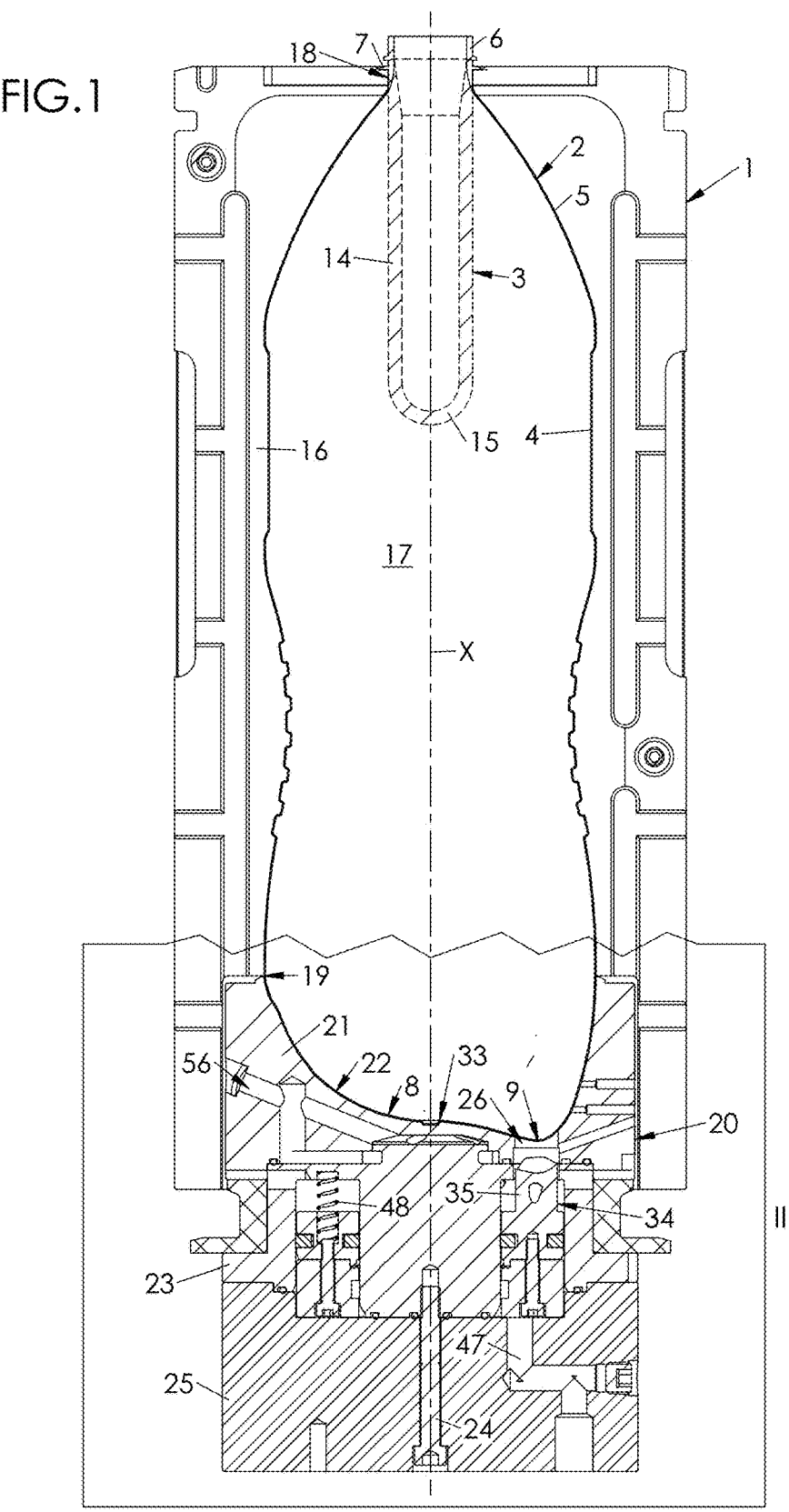
FIG. 1 is a cutaway view of a mold that is equipped with a mold bottom that is equipped with air vents and an insert that is provided with projections that slide into the air vents; the mold is shown in the retracted position of the insert.

FIG. 1 shows a mold 1 for the forming of a container 2 by blow molding or stretch blow molding from a parison 3 made of plastic material (in particular PET).

The parison 3 can be an intermediate container that has undergone a first blow-molding operation starting from a preform. It can also be, as in the illustrated example, a crude injection preform. Also, hereinafter, the reference 3 will be used interchangeably to refer to any type of parison or preform.

The container 2 comprises an essentially cylindrical body 4 that extends along a main axis X, a shoulder 5 that extends, in narrowing, into the extension of the body 4 at an upper end of the former, a neck 6 that is open at an upper end of the shoulder 5 from which it is separated by a collar 7, and a bottom 8 that closes the body 4 at a lower end of the former. The bottom 8 has a peripheral seat 9 by which the container 2 is intended to rest on a flat surface such as a table, and a raised central zone 10 (where an injection button 11 of the preform 3 is located), to which the seat 9 is connected by an arch.

According to an embodiment that is illustrated in the figures (and more particularly in FIGS. 9 and 11), the bottom 8 of the container 2 is petal-shaped and comprises alternating spaced feet 12 that end by ends that jointly form (although in a discrete manner in the mathematical meaning of the term) the seat 9, and valleys 13 with an essentially circular radial cross-section that radiate from the central zone 10 to the body 4.

The preform 3 comprises a body 14 with an essentially tubular shape, designed to form the body 4 and the shoulder 5 of the container 2, a neck 6 which is that of the container 2 and remains unchanged during the forming, and a hemispherical bottom 15 that is designed to form the bottom 8 of the container 2.

The mold 1 comprises a side wall 16 that defines a cavity 17 bearing the impression of the body 4 and the shoulder 5 of the container 2. The side wall 16 extends along a main axis that, when the container 2 is formed, is merged with the main axis X of the former. Below, the expression "main axis" interchangeably refers to the axis of the container or that of the side wall 16.

According to a conventional embodiment, the side wall 16 is subdivided into two half-molds that can move in relation to one another (for example by being articulated around a hinge that is parallel to the main axis X), between an open position in which the two half-molds are separated angularly from one another to make possible the introduction of the preform 3 and the evacuation of the container 2, and a closed position in which the two half-molds are flattened against one another to define together the cavity 17, as described in, for example, the French patent application FR 2 856 333 or the corresponding international application WO 05/002820 (Sidel).

The side wall 16 defines an upper opening 18, by which the preform 3 is suspended by its collar 7, and an opposite lower opening 19. Since the line of FIG. 1 is merged with a parting line between the two half-molds, only one of them is shown there.

The mold 1 is also equipped with a mold bottom 20 that comprises, firstly, a bottom unit 21 (for example made of steel or in an aluminum alloy) having a molding face 22 in relief bearing the impression of at least one part of the bottom 8 of the container 2, and which completes the impression of the former with the side wall 16.

The bottom unit 21 is attached to a support 23 that is itself mounted (for example by means of a screw 24) on a stand 25 that can move in translation in relation to the side wall 16 between a loading/unloading position in which the unit 21 is separated from the cavity 17 to make possible the evacuation of the container 2 that is formed and the installation of a new preform 3, and a forming position (illustrated in FIGS. 1, 2 and 4), in which the molding face 22 seals the cavity 17 to complete with the former the impression of the container 2 that is to be formed.

The mold bottom 20 is equipped with at least one pressure-release air vent 26 that is formed in the mold unit 21 and that empties, via an inner opening 27, onto the molding face 22 and, via an outer or peripheral opening 28, into at least one pipe 29, 30 for exposure to air. The air vent 26 (or each air vent 26) is formed by a scalloping made in the unit 21 in a direction that is essentially parallel to the main axis X, in a seating zone corresponding to the seat 9 of the container 2 and formed by recessed reserved places 31.

According to an embodiment that is illustrated in the figures, where the container 2 has a petal-shaped bottom 8, the molding face 22, bearing the impression of the former, comprises alternating ribs 32 (bearing the impression of the valleys 13), which radiate from a central zone 33 (bearing the impression of the central zone 10 of the bottom 8), and recessed reserved places 31 (each forming the above-mentioned seating zone) bearing the impression of the feet 12 (here, five in number), which extend between the ribs 32. In this case, the bottom unit 21 comprises a series of air vents 26 (here, five in number) that are spaced (here, distributed over a circular sector), made in the recessed reserved places 31. More specifically, as in the illustrated example, an air vent 26 is made in the bottom of each recessed reserved place 31.

Secondly, the mold bottom 20 comprises an insert 34 that is provided with at least one projection 35 that is housed in the air vent 26 (when there is only one of them) or in each air vent 26 (when there are several of them, as in the illustrated example) and that has a terminal face 36 bearing the impression of at least a part of the seat 9 of the container 2.

According to an embodiment that is illustrated in the figures, in which the container 2 has a petal-shaped bottom 8, the insert 34 comprises a number of spaced air vents 26 (here, distributed in a circular sector). In this case, the terminal face 36 of each projection 35 has an impression of the end of a foot 12. The terminal faces 36 of the projections 35 then form the impression of the entire seat 9 of the container 2, consisting of all of the ends of the feet 12. In this case, the terminal face 36 is concave.

The insert 34 is provided with an internal circuit 37 for heat regulation of the (or of each) projection 35, in such a way that the former is kept at a moderate temperature (between 5° C. and 30° C., and preferably between 10° C. and 20° C.).

The insert 34 is mounted to move, in relation to the bottom unit 21, between:
A retracted position (FIGS. 1, 2, 3, 4) in which the terminal face 36 of the (or of each) projection 35 is separated from the inner opening 27 of the air vent 26 and lets the former communicate freely with the (or each) pipe 29, 30 for exposure to air, and
A deployed position (FIGS. 7, 8, 9, 11) in which the terminal face 36 extends in the vicinity of the inner opening 27.

Figure 7:
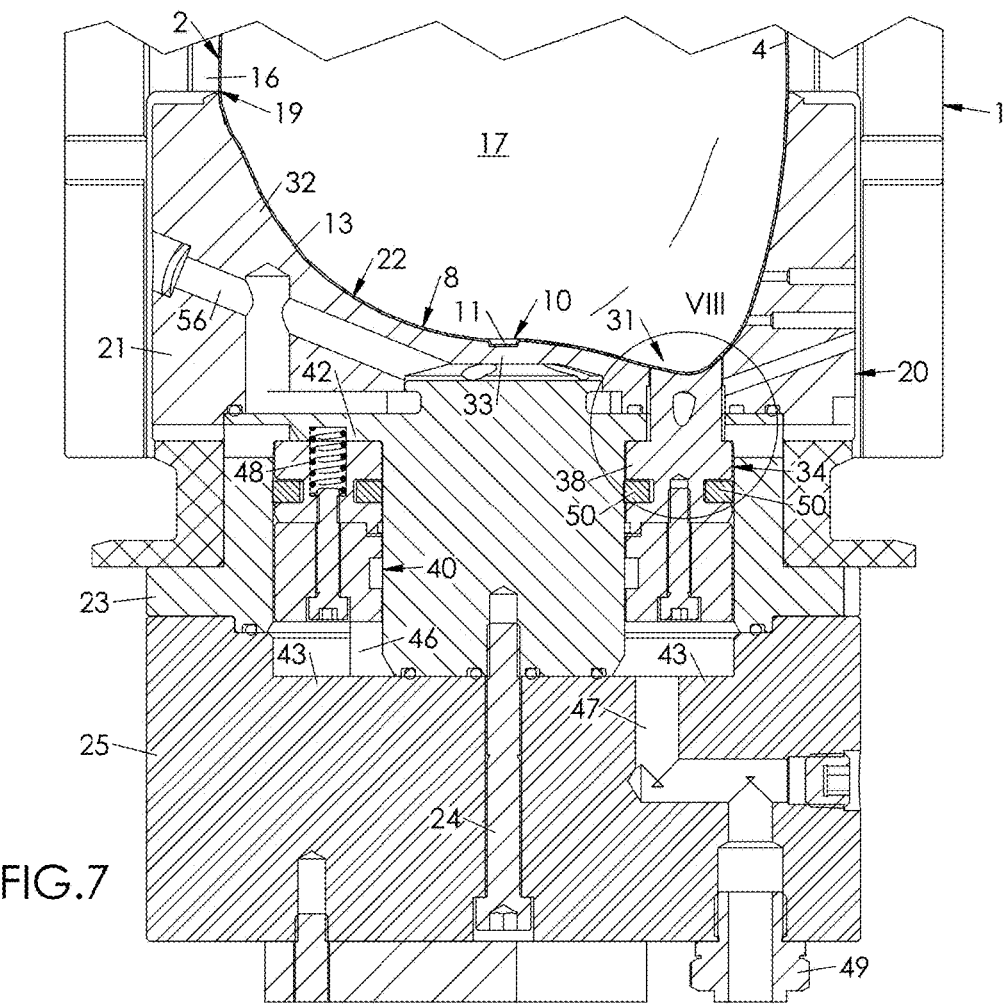
FIG. 7 is a view that is similar to FIG. 2, showing the insert in the deployed position.
Figure 8:
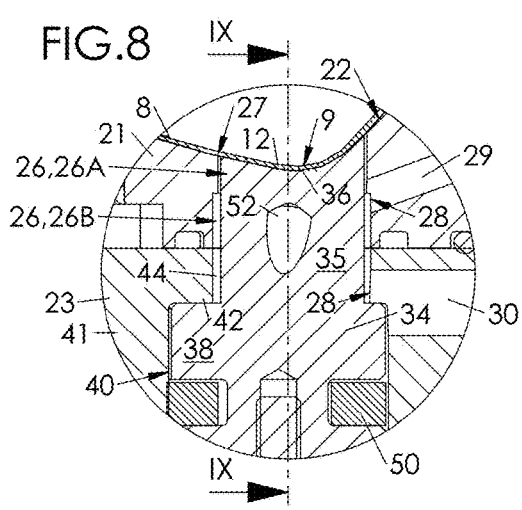
FIG. 8 is a detail view of the insert, on an enlarged scale, according to the inset VIII of FIG. 7.
Figure 9:
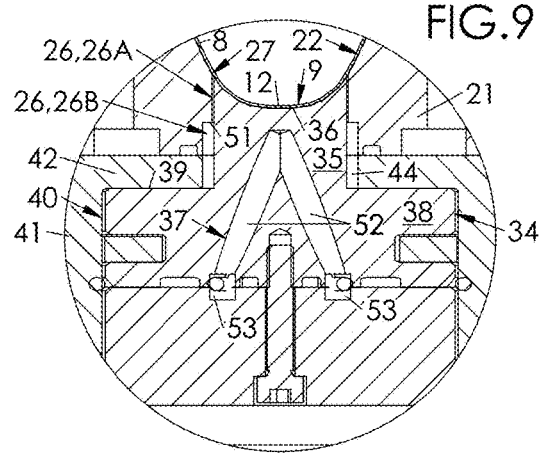
FIG. 9 is a detail cutaway view along the plane IX-IX of FIG. 8.
Figure 10:
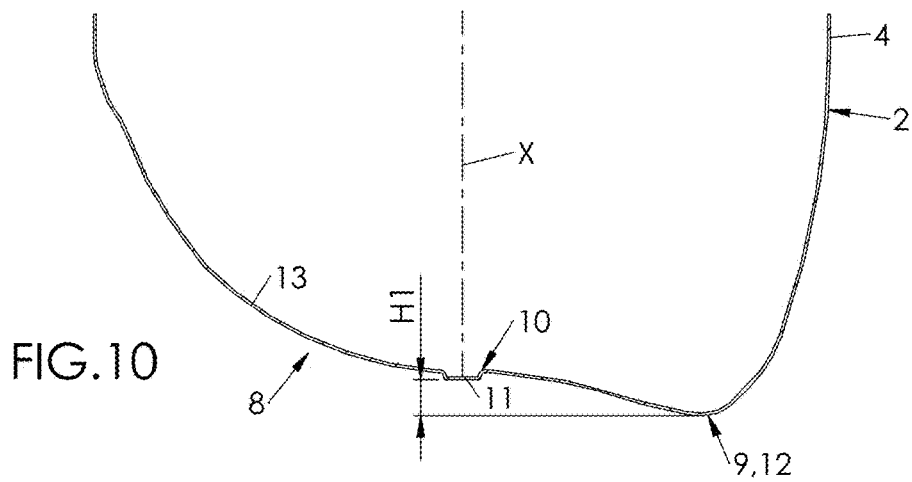
FIG. 10 is a cross-section of the bottom of the container formed in a mold as shown in the preceding figures.

According to a first embodiment, illustrated in FIGS. 7, 8 and 9, the terminal face 36 of the (or of each) projection 35 extends, in the deployed position of the insert 34, into the extension of the molding face 22. In this case, the material at the end of the blow molding adopts a continuous curvature at the bottom of the seat 9 (i.e., at the bottom of the feet 12 in the petal-shaped case that is illustrated), and a bottom 8 is obtained that has a clearance (defined as the distance between the central button 11 and the seat 9) denoted H1, cf. FIG. 10.

Figure 11:
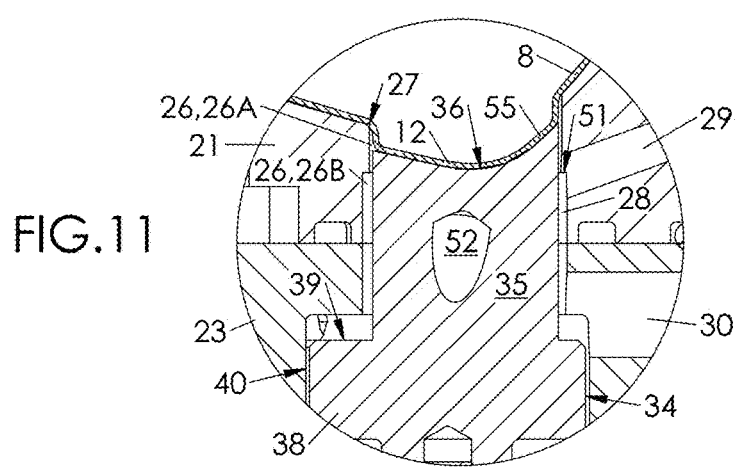
FIG. 11 is a view that is similar to FIG. 9, illustrating a variant embodiment in which, in the deployed position, the projection is slightly set back in relation to the opening.
Figure 12:
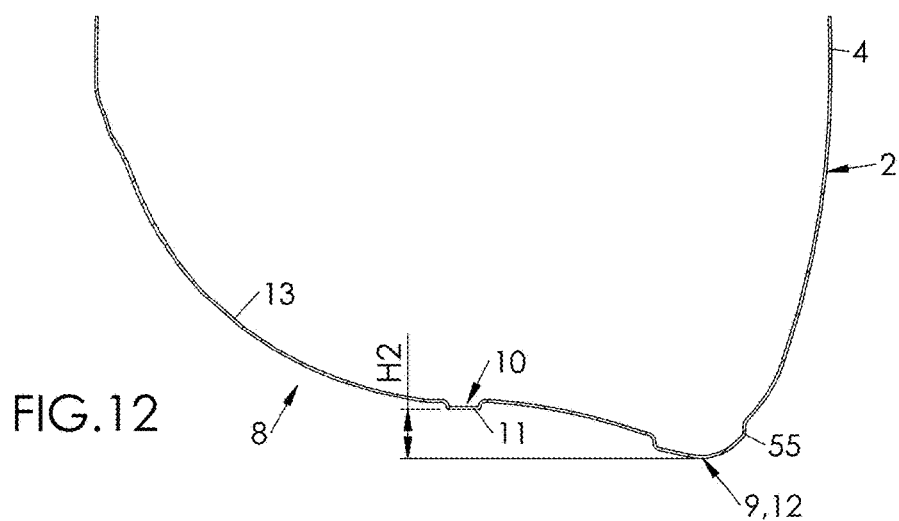
FIG. 12 is a cross-section of the bottom of the container that is formed in a mold as illustrated in FIG. 11.

According to a second embodiment that is illustrated in FIG. 11, the terminal face 36 of the (or of each) projection 35 extends, in the deployed position of the insert 34, in an offset manner in relation to the inner opening 27, by a distance that is advantageously between 0.5 mm and 5 mm. In this case, the material adopts, at the end of the blow molding, a variation of curvature in the area of the inner opening 27 and forms an extrusion that extends to the terminal face 36 of the projection 35 and constitutes, at the bottom of each foot 12, a bump that increases the clearance of the bottom 8 to a value H2 (cf. FIG. 11) that is higher than H1. This increased clearance H2 makes it possible for the bottom 8 to deform according to a greater amplitude under the pressure of the contents of the container 2, without it being necessary to modify the geometry of the feet 12 and valleys 13, which ensure the performances of the bottom 8 in terms of mechanical strength. It will be noted that if the set-back distance of the terminal face 36 in relation to the inner opening 27 is too large, the material runs the risk of not reaching the terminal face 36 of the projection(s) 35 and therefore of forming a bump of uncontrolled shape that can make the seat 9 wobbly (primarily in the case where the former is formed by several feet 12 as in the petal-shaped bottom 8 that is illustrated).

Figure 13:
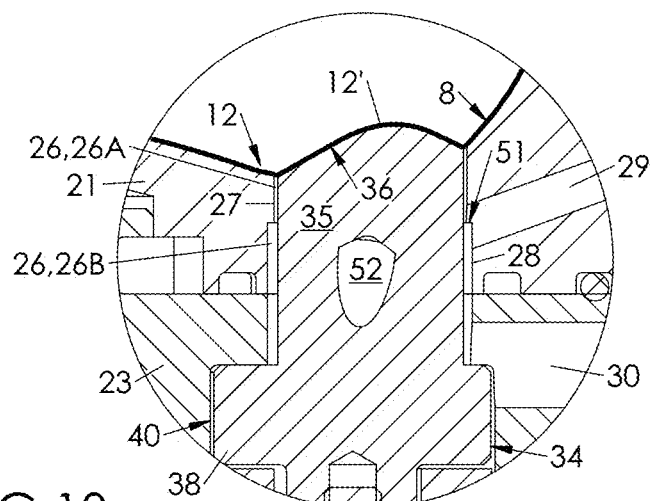
FIG. 13 is a view that is similar to FIGS. 9 and 11, illustrating a variant embodiment in which, in the deployed position, the projection is bent and forms, in the deployed position of the insert, a bump at the end of the foot, toward the inside of the container.
Figure 14:
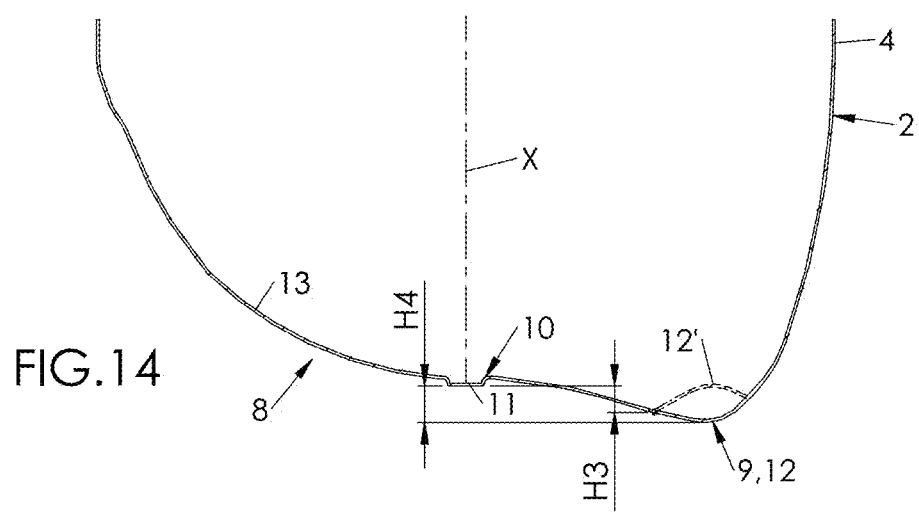
FIG. 14 is a cross-section of the bottom of the container that is formed in a mold as illustrated in FIG. 14.

According to a third embodiment that is illustrated in FIGS. 13 and 14, the terminal face 36 of the (or of each) projection 35 is bent (or convex) and forms, in the deployed position of the insert, a bump at the end of the foot 12, toward the inside of the container 2. In this way, when the container 2 is formed, each foot 12 is provided, at its end, with a hollow 12' projecting toward the inside of the container 2. The container 2 thus formed has, empty, a clearance H3 that is smaller than the clearance H1 of the first embodiment described above. Since the container 2 is transferred after forming toward a filling unit (not shown) by being suspended by its collar 7, the absence of a stable seat for the container 2 does not pose a problem. The filling of the container 2 with carbonated contents puts it under pressure and causes the return of hollows 12' that form the seat 9, with the container 2 consequently able to rest, thanks to the former, on a flat surface (typically a conveyor or, subsequently, a table). The advantage of this embodiment is to make possible, with an equivalent seat diameter, a reduction in the blow-molding pressure or, with equivalent blow-molding pressure, increasing the seat diameter. In the two cases, it is possible to increase the clearance of the bottom 8, denoted H4 in FIG. 14.

It is preferable that the terminal face 36 be solid, i.e., have no perforations. However, it can be considered to provide in the terminal face 36 one or more air vents of small width (or diameter) that contribute to facilitating the evacuation of air without, however, running the risk of forming hot points on the container 2.

According to an embodiment that is illustrated in the figures, the insert 34 comprises a base that is shaped like a piston 38. This piston 38 has an upper face 39 from which the projections 35 emerge axially.

The piston 38 is mounted in translation in a jacket 40 that is integral with the mold unit 21. More specifically, in the illustrated example, the jacket 40 is formed in the support 23; this jacket 40 extends in an annular manner around a central shaft 41 and is delimited axially by an upper wall 42 that belongs to the support 23 and by a lower opposite wall 43 that belongs to the stand 25. The upper wall 42 is pierced by openings 44 that partly define the air vents 26 and in which are housed the projections 35 when the piston 38, also in annular form, is mounted in the jacket 40.

In the jacket 40, the piston 38 delimits an upper chamber 45, from the side of the upper wall 42, and a lower chamber 46, from the side of the lower wall 43. A fluid intake pipe 47 is formed in the stand 25 and empties, via the lower wall 43, into the lower chamber 46, to inject into the former a pressurized fluid (such as air or oil) that pushes back the piston 38 toward the upper wall 42, and therefore the insert 34 toward its deployed position. In the illustrated example, the jack that is constituted by the piston 38 and the jacket 40 is of the single-action type, and the mold bottom 20 comprises one (or multiple) return spring(s) 48 inserted between the upper wall 42 and the piston 38, and which permanently stress the former toward the inside wall 43, and therefore the insert 34 toward its retracted position. In the illustrated example, five return springs 48 are provided, cf. FIG. 5.

Thus, to place the insert 34 in its deployed position, a pressurized fluid (such as air or oil) is injected into the lower chamber 46, via the intake pipe 47 (and by means of, for example, a branched hose on the stand by means of a connector 49—partially shown in FIG. 7), which fluid pushes back the piston 38 toward the upper wall 42 (and therefore the insert 34 toward its deployed position) against the return spring(s) 48. In contrast, to place the insert 34 in the retracted position, the lower chamber 46 is exposed to open air, which balances the pressures in the two chambers 45, 46 and makes it possible for the spring(s) 48 to push the piston back toward the lower wall 43 (and therefore the insert 34 toward the retracted position).

The travel of the insert 34 between its retracted position and its deployed position is between 5 mm and 15 mm, and advantageously approximately 10 mm.

The sealing between the two chambers 45, 46 is advantageously carried out by means of annular segments 50 housed in grooves made in a peripheral manner in the piston 38.

As a variant, the movement of the insert 34 can be controlled by mechanical and non-pneumatic (or hydraulic) means, for example by a cam. For this purpose, a lower end of the insert can carry a cam follower (such as a roller), which works with a cam groove, with the permanent contact of the cam follower with the cam groove being ensured by, for example, a return spring. The cam groove has an upper section that moves the cam follower toward the top (and therefore the insert 34 toward its deployed position) and a lower section that makes it possible for the cam follower to come down (and therefore the insert 34 to return toward its retracted position).

In the illustrated example, where the container 2 has a petal-shaped bottom 8, each air vent 26 has in cross-section a profile of an essentially oval shape, of which the angular extension (measured in a transverse plane from the main axis X) is denoted A, the radial extension (also called small width) is denoted B, and the perimeter extension (also called large width, and measured perpendicularly to the radius passing through the geometric center of the inner opening 27) is denoted C.

Furthermore, the diameter of the pitch circle that passes through the points of the terminal faces 36 of the projections 35 corresponding to the ends of the feet 12 (also called seat circle) is denoted D1, and the outer diameter of the molding face 22, corresponding to the overall diameter of the bottom 8 of the container 2, is denoted D2.

The air vents 26, indicated in FIG. 6 by a gray pattern, can be sized in the following manner:

The angular amplitude A of each air vent 26 is between 10° and 45°; in the case (illustrated) of a petal-shaped bottom 8, this angular amplitude A is advantageously between 17° and 35°, and, for example, approximately 35°:

$$10° \leq A \leq 45°$$

Advantageously, for a petal-shaped bottom:

$$17° \leq A \leq 35°$$

And, for example, $$A \approx 35°$$

The small width B of each air vent 26 is between 20% and 60% of the radius of the pitch circle, and advantageously, for a petal-shaped bottom 8 as illustrated, approximately 40% of the radius of the pitch circle:

$$0.2 \cdot \frac{D1}{2} \leq B \leq 0.6 \cdot \frac{D1}{2}$$

And advantageously, for a petal-shaped bottom 8:

$$B \cong 0.4 \cdot \frac{D1}{2}$$

The large width C of each air vent 26 is between the small width B and twice the small width, and advantageously, for a petal-shaped bottom 8 as illustrated, approximately 1.45 times the small width:

$$B \leq C \leq 2 \cdot B$$

And advantageously, for a petal-shaped bottom 8:

$$C \cong 1.45 \cdot B$$

The individual surface, denoted Su, of each air vent 26 on a transverse plane, is between 1% and 4% of the projected surface of the bottom 8 (i.e., the surface of the disk of diameter D2), and advantageously, in the case of a petal-shaped bottom 8, approximately 3% of the former:

$$0.01 \cdot \pi \left(\frac{D2^2}{2}\right) \leq Su \leq 0.04 \cdot \pi \left(\frac{D2^2}{2}\right)$$

And advantageously, for a petal-shaped bottom 8:

$$Su \cong 0.03 \cdot \pi \left(\frac{D2^2}{2}\right)$$

The cumulative surface, denoted S, of the projection of the air vents 26 (the number of which is denoted N) on a transverse plane, is proportional to the individual surface Su of each one, in a ratio that is equal to the number N of air vents:

$$S = N \cdot Su$$

Or:

$$0.01 \cdot N \cdot \pi \left(\frac{D2^2}{2}\right) \leq S \leq 0.04 \cdot N \cdot \pi \left(\frac{D2^2}{2}\right)$$

In practice, the cumulative surface S is between 10% and 30% of the projected surface of the bottom 8 (i.e., the surface of the disk with diameter D2), and advantageously, in the case of a petal-shaped bottom 8, approximately 15% of the former:

$$0.1 \cdot \pi \left(\frac{D2^2}{2}\right) \leq S \leq 0.3 \cdot \pi \left(\frac{D2^2}{2}\right)$$

And advantageously, for a petal-shaped bottom 8:

$$S \cong 0.15 \cdot \pi \left(\frac{D2^2}{2}\right)$$

Each projection 35 has, in cross-section (i.e., in a plane that is perpendicular to the main axis X), a profile that is complementary to that of the air vent 26 in which the projection 35 is housed, by taking into account an operational play necessary to its sliding.

In the deployed position of the insert 34, this play is approximately 0.25 mm in the area of the inner opening 27.

So as to facilitate the evacuation of the air during the blow molding of the container 2, the or each air vent 26 comprises an inner portion 26A, which extends axially up to the inner opening 27, and an outer portion 26B with a larger section, which extends axially into the extension of the inner portion 26A by being separated from the former by a shoulder 51. The height of the inner portion 26A of the air vent 26 is less than the travel of the insert 34 in such a way that in the retracted position of the former, the terminal face 36 of the projection 35 is located in the outer portion 26B, set back in relation to the shoulder 51. The result is an increase in the section of passage for the air around the projection 35, and therefore an increase in the evacuation flow rate of the air. The play between the projection and the outer portion 26B of the air vent 26 is advantageously greater than or equal to 0.5 mm, and, for example, on the order of 0.7 mm.

Figure 2:
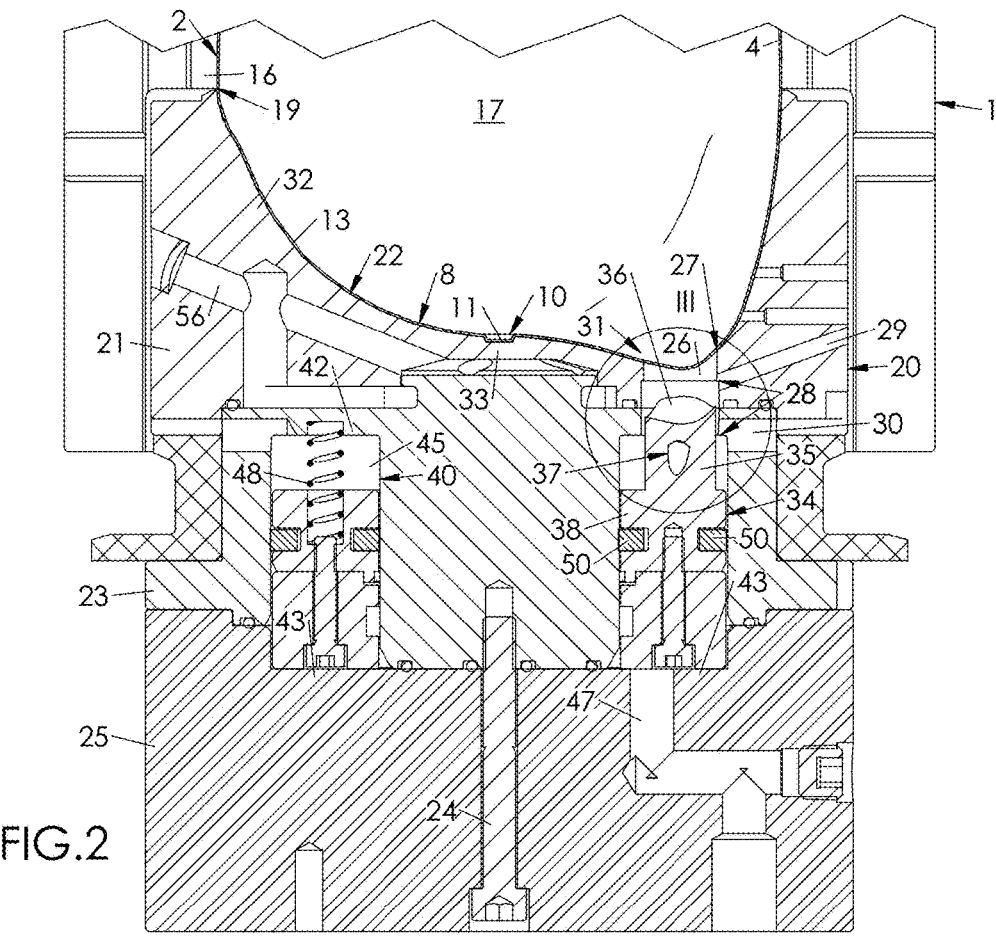
FIG. 2 is a detail view of the mold bottom, on an enlarged scale, according to the inset II of FIG. 1.
Figure 3:
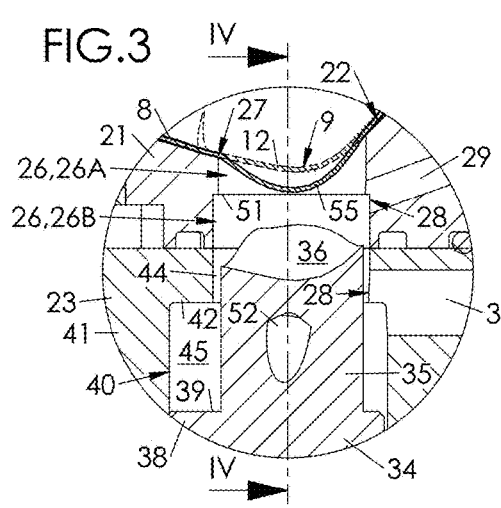
FIG. 3 is a detail view of the insert, on an enlarged scale, according to the inset III of FIG. 2.

According to an embodiment that is illustrated in FIGS. 2 and 3, the mold bottom 20 comprises a primary pipe 29 for exposure to air, which empties into the air vent 26 in the area of the shoulder 51. When the insert 34 is in its retracted position, the inner opening 27 communicates directly with the primary pipe 29. The former, made radially in the bottom unit 21, furthermore empties into the open air on an outer face of the unit 21.

The mold bottom 20 also advantageously comprises a secondary pipe 30 for exposure to air that empties into the air vent 26 in the area of the outer portion 26B. When the insert 34 is in its retracted position, the secondary pipe 30 empties opposite the projection 35, but the relatively significant play between the projection 35 and the outer portion 26B makes it possible for the air to circulate easily from the inner opening 27 to the secondary pipe 30. It will be noted that the secondary pipe 30, furthermore, produces the exposure to air (and therefore the holding at atmospheric pressure) of the upper chamber 45.

Figure 4:
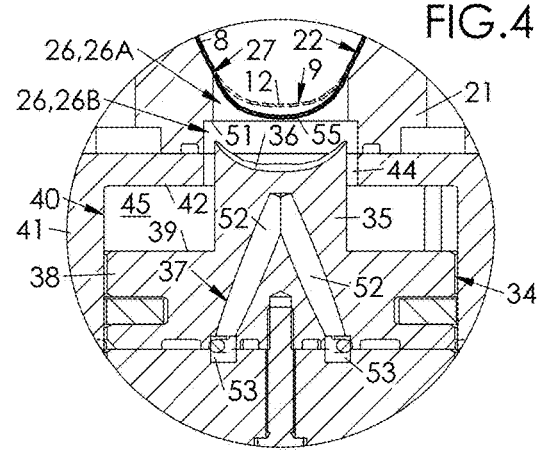
FIG. 4 is a detail cutaway view along the plane IV-IV of FIG. 3.

The heat regulation circuit 37 of the insert is, for example, of the fluid type and in this case comprises channels 52 formed in a closed circuit in each projection 35, in which a refrigerating fluid (such as water) circulates. In the example that is illustrated in FIG. 4, these channels 52 are fed by a collector 53 that is connected to an outer circuit via pipes 54 that are perforated in the stand 25, visible in the lower part of FIG. 6.

To form the container 2 from the preform (or more generally from a parison) 3, the procedure is as follows.

With the insert 34 being in the retracted position, the preform 3 (illustrated in dotted lines in FIG. 1) that is first heated to a temperature that is higher than the glass transition temperature of the material is introduced into the mold 1.

A pressurized gas (such as air) is then injected into the preform 3 while stretching it, preferably by means of an elongation rod. The pressure is increased during injection, from a pre-blow-molding pressure of approximately 7 bars to a blow-molding pressure on the order of 17 bars. The material flattens against the side wall 16 and against the molding face 22 of the mold bottom 20. The air between the material during deployment and the bottom 20 is evacuated via the air vents 26 by being free to escape via the pipes 29, 30 for exposure to air in communication with the inner opening 27.

The insert 34 is always in its retracted position when the blow molding begins at 17 bars.

Under these conditions, the material faithfully takes the impression of the molding face 22, with the evacuation of the air continuing via the air vents 26.

Under the blow-molding pressure, the material first penetrates into each air vent 26 to form a bump 55 there (in solid lines in FIGS. 3 and 4, with the material in its final position being shown in dotted lines). It is noted, however, that this penetration is limited by the internal stress of the material, whose stretching imparts to it a partially crystalline structure and therefore a certain mechanical rigidity.

While maintaining the blow-molding pressure, the insert 34 is moved toward its deployed position. Each projection 35 then pushes back the bump 55 to give it the impression of the terminal face 36, either in the extension of the molding face 22 (the case of FIGS. 8 and 9), or slightly set back in relation to the former (the case of FIG. 11).

The material of the bottom 8 of the container 2 that is thus formed is quickly cooled not only in the zones in contact with the molding face 22 of the unit 21 (by means of a cooling circuit 56 that is visible in particular in FIGS. 1, 2 and 7), but also in the zones (here corresponding to the feet 12 of the container 2) that are in contact with the terminal faces 36 of the projections 35, since the former are held at a moderate temperature by the heat regulation circuit 37.

In this way, the material that supplies the zones where the air vents 26 are positioned sets and does not undergo any subsequent uncontrolled deformation. It is consequently possible to make the air vents 26 wide by providing them with a significant scope in relation to the projected surface of the bottom 20, as is evident from the examples that are provided above for the angular amplitude A, the widths B and C, and the surface S.

The result is a better blowability of the container 2 ("blowability" of a container is defined as its capacity to be formed by blow molding) thanks to the increased flow of air through air vents 26, which are released when the insert 34 is in the retracted position, with the openings 27, 28 being in free communication with the pipes 29, 30 for exposure to air.

This likewise makes it possible to reduce the blow-molding pressure on the order of 2 to 3 bars, enhancing energy savings. Thus, a container that requires a blow-molding pressure of 20 bars to be formed in a mold that is equipped with standard air vents only requires a blow-molding pressure on the order of 17 to 18 bars, or a savings of 10 to 15%, to be formed in the mold 1 that was just described (with equal impression).

The invention claimed is:

1. A mold bottom (20) for a mold (1) for manufacture, by blow molding or stretch blow molding of a parison (3) made of plastic material, of a container (2) that has a bottom (8) with a peripheral seat (9), the mold bottom (20) comprising:
    a bottom unit (21) that has a molding face (22) in relief bearing the impression of at least a part of the bottom (8) of the container (2), a pressure-release air vent (26) being formed within the unit (21) and emptying out, via an inner opening (27), on the molding face (22) and, via an outer opening (28), into a pipe (29, 30) for exposure to air; and
    an insert (34) that is provided with a projection (35) housed in the air vent (26) and that has a terminal face (36) bearing the impression of at least one part of the seat (9) of the container (2),
    wherein the insert (34) is provided with an inner circuit (37) for heat regulation of the projection (35),
    wherein the insert (34) is mounted to move, in relation to the bottom unit (21), between:
        a retracted position in which the terminal face (36) of the projection (35) is separated from the inner opening (27) and permits the inner opening to communicate with the pipe (29, 30) for exposure to air, and
        a deployed position in which the terminal face (36) extends in the vicinity of the inner opening (27),
    and wherein in the deployed position, the terminal face (36) of the projection (35) extends into the extension of the molding face (22).

2. The mold bottom (20) according to claim 1, wherein in the deployed position, the terminal face (36) of the projection (35) extends in a setback manner, in relation to the inner opening (27), by a distance of between 0.5 mm and 5 mm.

3. The mold bottom (20) according to claim 1, wherein the terminal face (36) is concave.

4. The mold bottom (20) according to claim 1, wherein the terminal face (36) is convex.

5. The mold bottom (20) according to claim 1, wherein the insert (34) comprises a piston (38) that is mounted in translation in a jacket (40) that is integral with the bottom unit (21).

6. The mold bottom (20) according to claim 1, wherein the air vent (26) comprises an inner portion (26A), which extends to the inner opening (27), and an outer portion (26B) with a larger section, which extends into the extension of the inner portion (26A) by being separated from the former by a shoulder (51).

7. The mold bottom (20) according to claim 6, further comprising:
    a primary pipe (29) for exposure to air, which empties into the air vent (26) in the area of the shoulder (51).

8. The mold bottom (20) according to claim 6, further comprising:
    a secondary pipe (30) for exposure to air, which empties into the air vent (26) in the area of the outer portion (26B).

9. The mold bottom (20) according to claim 1, wherein the bottom unit (21) is provided with a plurality of air vents (26) that are spaced from one another, and the insert (34) comprises a peripheral series of projections (35) that are spaced from one another.

10. The mold bottom (20) according to claim 9, wherein the molding face (22) bears the impression of a petal-shaped bottom (8) of the container (2) and comprises alternating ribs (32) bearing the impression of valleys (13) of the petal-shaped bottom (8), which radiate from a central zone (33), and with recessed reserved places (31) bearing the impression of feet (12) of the petal-shaped bottom (8), which extend between the ribs (32), the air vents (26) are made in the recessed reserved places (31), and the terminal face (36) of each one of the projections (35) bears the impression of the feet (12) of the container (2).

11. A mold (1) for the manufacture of a container (2) from a parison (3) made of plastic material, comprising:
    a side wall (16) bearing the impression of a body (4) of the container (2); and
    a mold bottom (20) according to claim 1, which completes the impression of the container (2) with the side wall (16).

12. A method for manufacturing a container (2), comprising:
- introducing into a mold according to claim 11 a parison (3) made of plastic material, heated in advance to a temperature that is higher than the glass transition temperature of the material;
- in the retracted position of the insert (34), injecting a pressurized gas into the parison (3) that establishes a pressure in the parison (3); and
- while maintaining the pressure in the parison (3), moving the insert (34) toward its deployed position.

13. The mold bottom (20) according to claim 2, wherein the terminal face (36) is concave.

14. The mold bottom (20) according to claim 2, wherein the insert (34) comprises a piston (38) that is mounted in translation in a jacket (40) that is integral with the bottom unit (21).

15. The mold bottom (20) according to claim 3, wherein the insert (34) comprises a piston (38) that is mounted in translation in a jacket (40) that is integral with the bottom unit (21).

16. The mold bottom (20) according to claim 4, wherein the insert (34) comprises a piston (38) that is mounted in translation in a jacket (40) that is integral with the bottom unit (21).

* * * * *